(12) United States Patent
Yoshiura et al.

(10) Patent No.: US 6,775,775 B1
(45) Date of Patent: Aug. 10, 2004

(54) METHOD OF PHYSICAL INDIVIDUAL AUTHENTICATION AND SYSTEM USING THE SAME

(75) Inventors: Hiroshi Yoshiura, Tokyo (JP); Ryoichi Sasaki, Fujisawa (JP); Mitsuru Iwamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/492,083

(22) Filed: Jan. 27, 2000

(30) Foreign Application Priority Data

Jan. 27, 1999 (JP) .......................................... P11-018030

(51) Int. Cl.[7] .............................. H04K 1/00; H04L 9/00; G06F 17/60
(52) U.S. Cl. ........................... 713/186; 705/66; 705/75; 713/182
(58) Field of Search ................................. 713/186, 185, 713/184, 193, 171, 172, 182; 380/30; 340/5.83, 5.84; 235/380, 379; 705/75, 66

(56) References Cited

U.S. PATENT DOCUMENTS

| | | | |
|---|---|---|---|
| 4,993,068 A | * 2/1991 | Piosenka et al. | 713/186 |
| 5,259,025 A | * 11/1993 | Monroe et al. | 705/75 |
| 5,321,751 A | * 6/1994 | Ray et al. | 713/186 |
| 5,420,924 A | * 5/1995 | Berson et al. | 713/186 |
| 5,742,685 A | * 4/1998 | Berson et al. | 713/186 |
| 5,787,186 A | * 7/1998 | Schroeder | 382/115 |
| 6,181,807 B1 | * 1/2001 | Setlak et al. | 382/124 |
| 6,202,055 B1 | * 3/2001 | Houvener et al. | 705/44 |

OTHER PUBLICATIONS

Clark, Paul C. and Lance J. Hoffman. "BITS: a smartcard protected operating system", published 1994.*

* cited by examiner

*Primary Examiner*—Gregory Morse
*Assistant Examiner*—Michael J Simitoski
(74) *Attorney, Agent, or Firm*—Antonelli, Terry, Stout & Kraus, LLP

(57) ABSTRACT

An authentication system for authenticating a particular individual using a recording medium containing information for identifying the individual has a recording medium issuing apparatus including, a database for storing a feature value usable for identification of the individual to be authenticated with the recording medium, means for managing the database to store the feature value of the individual to be authenticated with the recording medium and for generating search information to retrieve the feature value of the individual from the database, means for generating cryptographic information by encrypting the thus generated search information using a private key based on public key cryptography, and means for recording the thus generated cryptographic information and certification information concerning the individual onto the recording medium; and a recording medium authenticating apparatus including, means for decrypting the cryptographic information recorded on the recording medium using a public key paired with the private key to decode the search information, and means for searching the database using the thus decoded search information to retrieve the feature value of the individual.

4 Claims, 11 Drawing Sheets

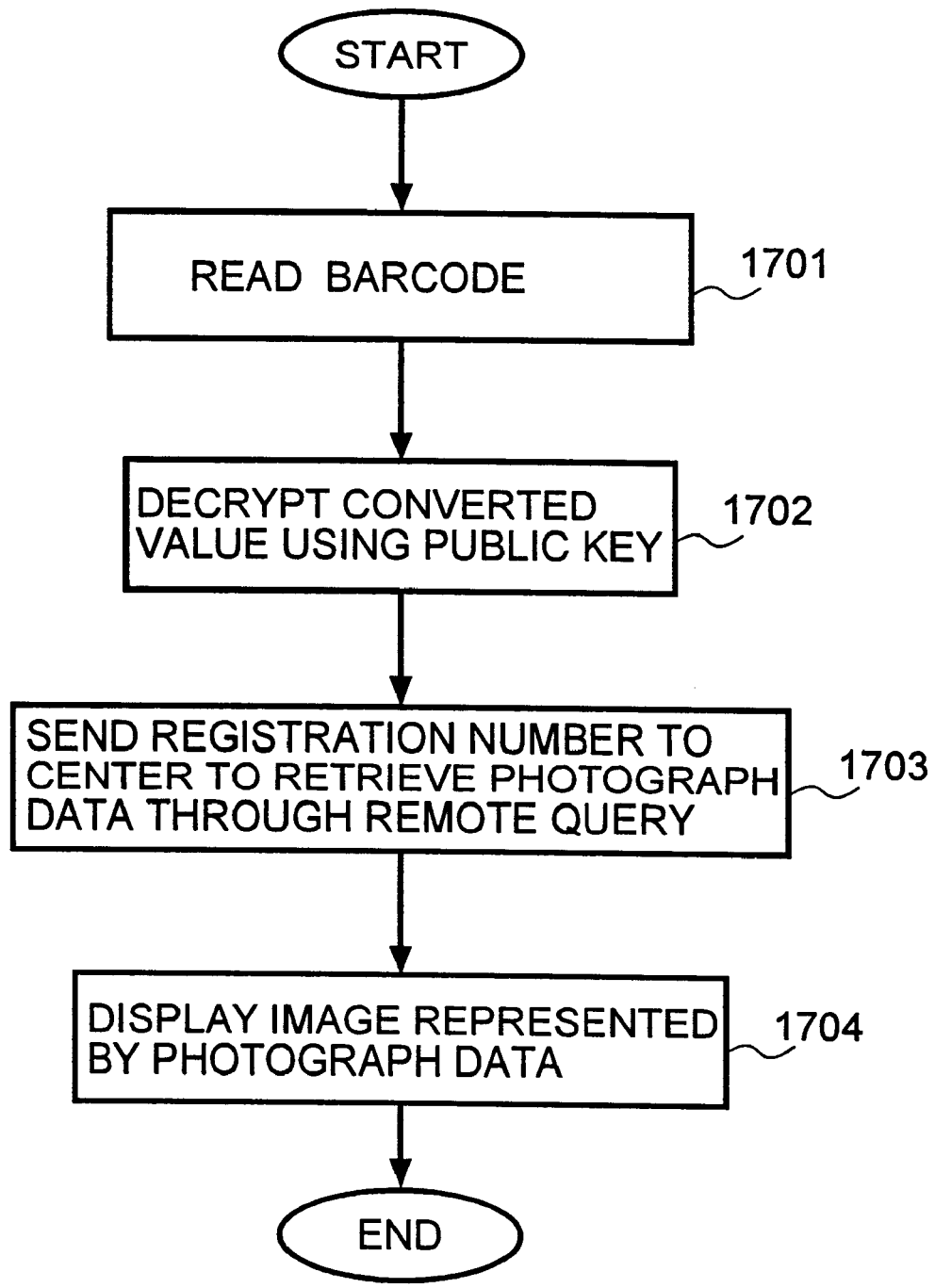

METHOD OF PHYSICAL INDIVIDUAL AUTHENTICATION AND SYSTEM USING THE SAME

BACKGROUND OF THE INVENTION

The present invention relates to a recording medium containing information for authenticating a particular individual, and more particularly to a technique for preventing forgery of authenticating information.

As recording media containing information for authenticating the identity of particular individuals, such as individual persons, there are various identification cards, such as drivers' licenses, passports, and employee identification cards, including a diversity of certificates of authenticity. These recording media are objects made of paper or the like on which character or photographic information for individual authentication is recorded by printing or handwriting so as to allow direct visual recognition.

In most cases, information for individual authentication comprises information identifying a particular individual and information certified therefor. For instance, in a passport, a photograph of the face of an individual person is attached as information identifying the individual person, and the name, address, date of birth, nationality, etc. of the individual person are entered as information certified therefor.

In authentication, an individual is identified by identification information recorded in a recording medium, and then certification information concerning the identified individual, which is also recorded in the recording medium, is confirmed for the identified individual. In the case of authentication of a passport, a certifying officer of an immigration/emigration bureau at an airport checks facial features of a holder of the passport against a photograph of the face attached in the passport, and if the holder of the passport is identified, the certifying officer confirms the name, address, date of birth, nationality, etc. recorded in the passport for the holder thereof.

Sometimes, various identification cards, such as drivers' licenses, passports and employee identification cards, including a diversity of certificates of authenticity, may be counterfeited for an illegal purpose. A passport, for example, may be forged for the purpose of illegal immigration, smuggling, or passage of a criminal. Therefore, there is a social demand for ensuring prevention of forgery of these identification cards and certificates.

Although various methods for preventing forgery have been devised heretofore, no satisfactory countermeasure against forgery has been realized yet. It is rather difficult to detect a forged passport containing a replaced photograph of a person's face, for example, giving rise to considerable problems.

SUMMARY OF THE INVENTION

It is therefore an object of the present invention to provide a recording medium containing information for authenticating an individual and an authentication system using the same for enabling effective prevention of forgery of information for individual identification, such as a photograph of a person's face in a passport.

In accomplishing this object of the present invention and according to one aspect thereof, there is provided an authentication system comprising:

a recording medium issuing apparatus including, means for generating cryptographic information by encrypting a feature value usable for identification of each individual to be authenticated with a recording medium, using a private key based on public key cryptography, and means for recording the thus generated cryptographic information and certification information concerning the individual onto the recording medium; and a recording medium authenticating apparatus including, means for decrypting the cryptographic information recorded on the recording medium using a public key paired with the private key to decode the feature value usable for identification of the individual to be authenticated with the recording medium.

In accordance with the authentication system mentioned above, as identification information of a particular individual to be authenticated with a recording medium, a feature value of the individual encrypted using a predetermined private key is recorded instead of a mere feature image of the individual represented by a photograph or the like. At the time of authentication, the feature value decoded using a public key paired with the predetermined private key employed for encryption, which is usable for identification of the particular individual to be authenticated with the recording medium, is compared with a feature value of each would-be certified individual. Unless the private key paired with the public key is known, it is extremely difficult to counterfeit feature value data of the individual, which is data encrypted using the private key and decrypted using the public key. Further, it is also very difficult to derive the private key from the public key or the feature value encrypted using the private key. Therefore, the present invention makes it possible to provide a recording medium for authentication which can effectively prevent forgery of information identifying an individual.

In the present invention, the individual may be a person and a feature of the individual to be used for identification thereof may be a physical feature of the person. In an application where a physical feature of a person is used for identification thereof, an image thereof to be authenticated with the recording medium may be applicable as a feature value thereof to be authenticated with the recording medium.

BRIEF DESCRIPTION OF THE DRAWINGS

The present invention will be more apparent from the following detailed description, when taken in conjunction with the accompanying drawings, in which:

FIG. 12 is a flowchart showing a processing procedure to be carried out by the card-authenticating apparatus according to the second preferred embodiment of the present invention.

DETAILED DESCRIPTION OF THE PREFERRED EMBODIMENTS

The present invention will now be described in detail in connection with an example in which a recording medium containing information for authenticating a individual is an identification information recording medium used for identifying an individual person.

In a first preferred embodiment of the present invention, an authentication system comprises at least one card-issuing apparatus for issuing an identification information recording medium and at least one card-authenticating apparatus for authenticating an individual person using the identification information recording medium issued by the card-issuing apparatus. The identification information recording medium used in the present preferred embodiment is a wearable electronic recording medium capable of recording electronic data, such as a memory card, IC card, magnetic card or any other type of electronic card.

Figure 1:
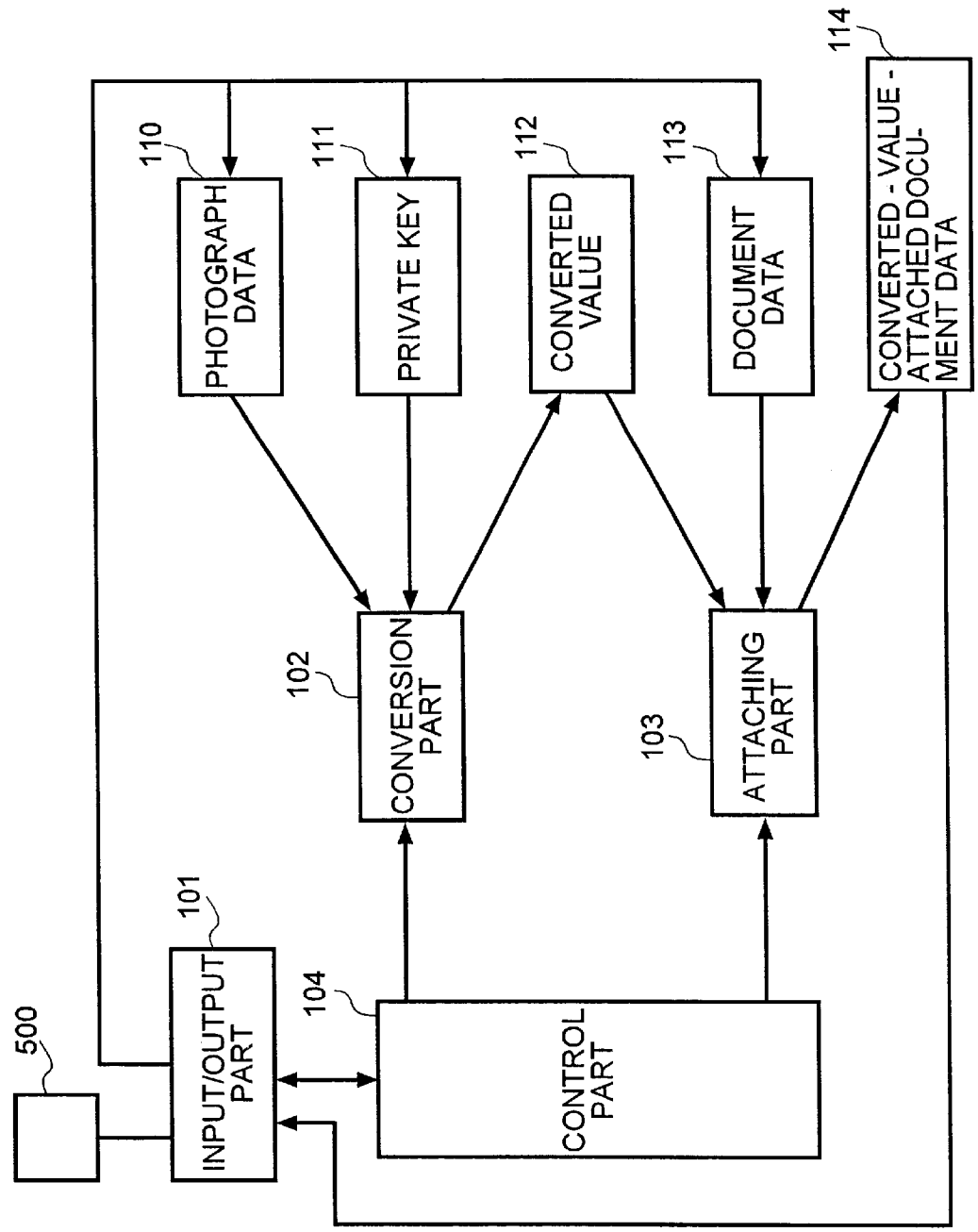
FIG. 1 is a block diagram showing the overall configuration of a card-issuing apparatus according to a first preferred embodiment of the present invention.

Referring to FIG. 1, there is shown an overall configuration of a card-issuing apparatus 100, which comprises an input/output part 101, a control part 104, a conversion part 102, and an attaching part 103. The input/output part 101 is used to input information from an identification information recording medium 500 into the card-issuing apparatus 100. The contents of the identification information recording medium 500 are photograph data 110, which is image data of the face of a person certified with the identification information received from the recording medium 500 (hereinafter referred to as a certified person), a private key 111 formed by a person or organization that assures the identity of the certified person with the identification information received from the recording medium 500 (hereinafter referred to as a certifier), and document data 113 containing the name, address, date of birth and other descriptions concerning the certified person assured with the identification information received from the recording medium 500. The input/output part 101 is also used to record converted-value-attached document data 114 (to be described later) onto the identification information in the recording medium 500. The conversion part 102 encrypts the photograph data 110 using the private key 111 to generate a converted value 112. The attaching part 103 attaches the converted value 112 to the document data 113 to produce the converted-value-attached document data 114. The control part 104 controls the above-mentioned operations of the input/output part 101, the conversion part 102 and the attaching part 103.

Figure 2:
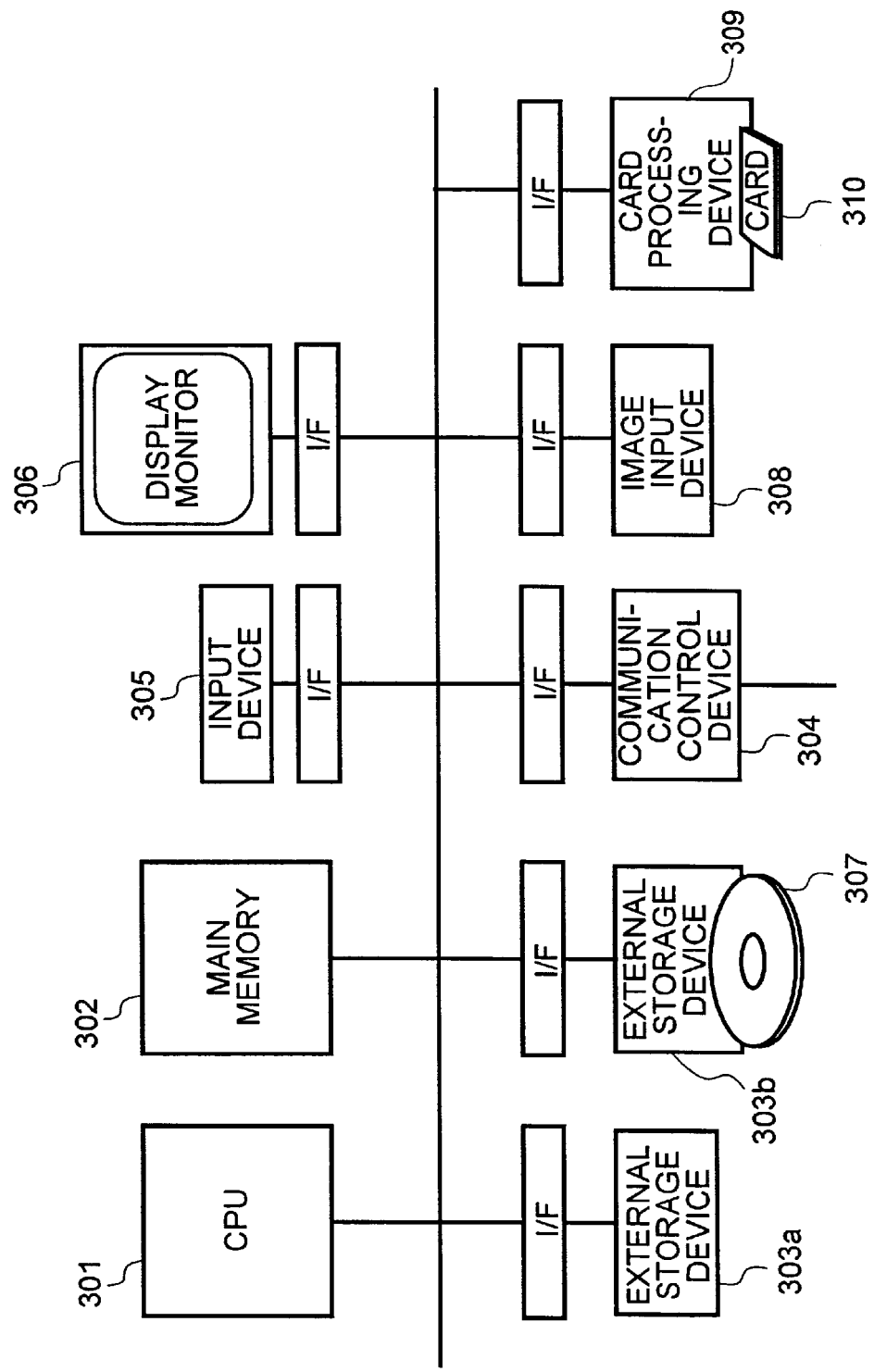
FIG. 2 is a block diagram showing an example of a hardware configuration of the card-issuing or the card-authenticating apparatus according to the present invention.

As shown in FIG. 2, in the practice of the present invention, the card-issuing apparatus 100 can be embodied in an electronic computer system comprising a CPU 301, a main memory 302, an external storage device 303a, such as a hard disk unit, an additional external storage device 303b, a communication control device 304, an input device 305, such as a keyboard or pointing device, an output device 306, such as a display monitor, an image input device 308 for capturing image data, a card processing device 309 for processing a card 310, which serves as an identification information recording medium, etc. In the card-issuing apparatus 100, the card 310 corresponds to the identification information recording medium 500 which is also referred to as an electronic card 500, and the card processing device 309 is an electronic card writer device for writing data onto the electronic card 500.

As the image input device 308, a device which inputs image data from a photograph of each certified person or a device which directly takes a photograph of each certified person and inputs image data thereof may be employed.

The input/output part 101, the control part 104, the conversion part 102 and the attaching part 103 shown in FIG. 1 are implemented as processes to be carried out on the electronic computer system by executing a program accessed by the CPU 301 from the main memory 302. This program may be arranged as a program which is pre-stored in the external storage device 303a and loaded into the main memory 302 as required or a program which is pre-loaded in the main memory 302. Alternatively, this program may be stored into the external storage device 303a or loaded into the main memory 302 through the external storage device 303b from a portable storage medium 307, such as a CD-ROM, or through the communication control device 304 from a network connected therewith.

Figure 3:
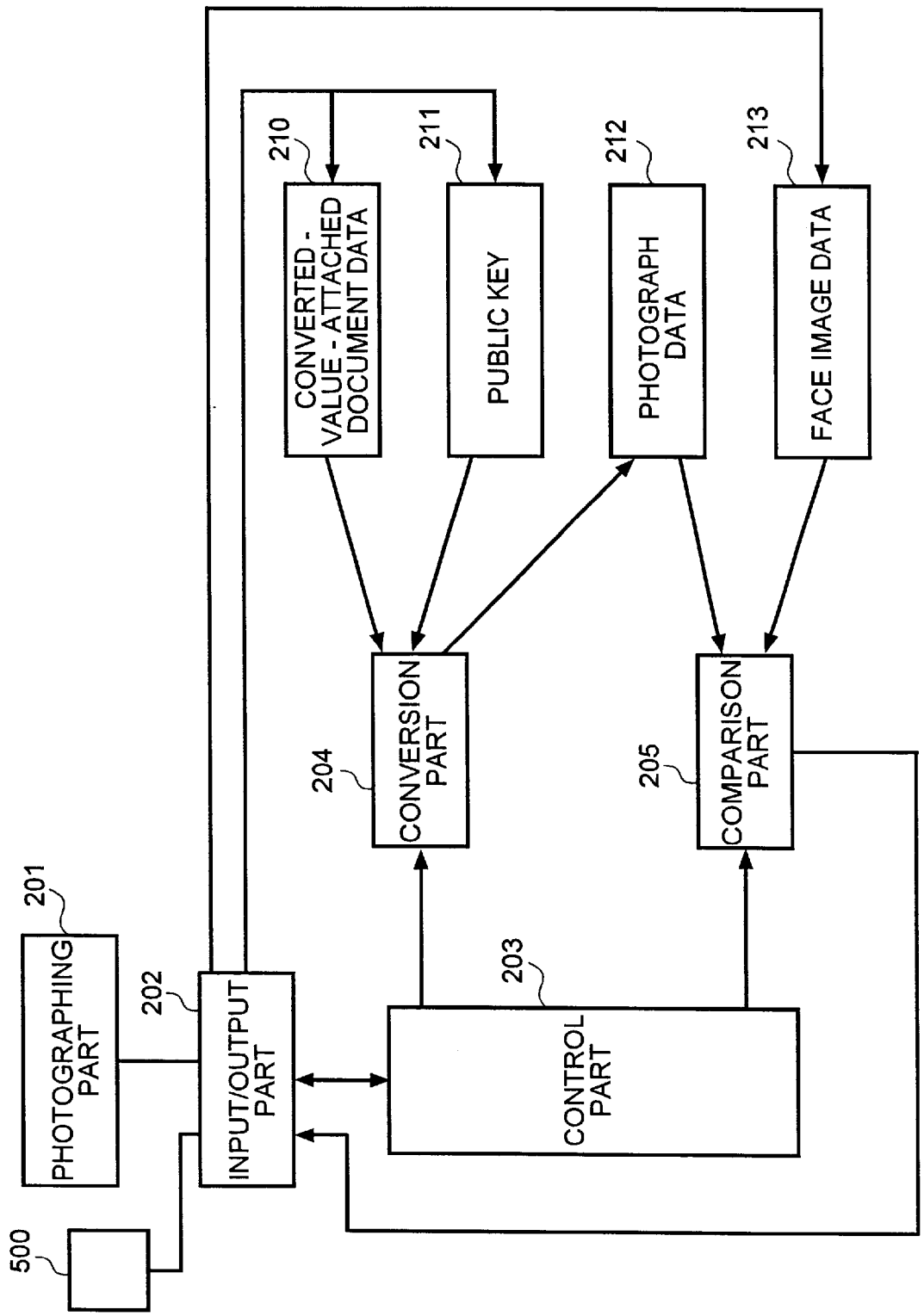
FIG. 3 is a block diagram showing an overall configuration of a card-authenticating apparatus according to the first preferred embodiment of the present invention.

Referring to FIG. 3, there is shown an overall configuration of a card-authenticating apparatus 200, which comprises a photographing part 201, an input/output part 202, a control part 203, a conversion part 204, and a comparison part 205.

The input/output part 213 is used to input a public key 211 of the certifier, face image data 213 of a would-be certified person through the photographing part 201, and converted-value-attached document data 210 recorded on the identification information recording medium 500. The input/output part 213 is also used to display the result of comparison attained through the comparison part 205 (to be described later), an image represented by photograph data 212, and document data contained in the converted-value-attached document data 210. Using the public key 211 of the certifier, the conversion part 204 decrypts the photograph data 212 of the certified person, which has been encrypted using the private key 111 formed by the certifier and which has then been contained in the converted-value-attached document data 210. Thus, the photograph data 212 of the certified person is restored to an original state thereof. The comparison part 205 compares the photograph data 212 with the face image data 213 by a pattern matching technique or the like, and produces the result of comparison indicating whether a degree of similarity higher than a predetermined level is found therebetween. The control part 203 controls the above-mentioned operations of the photographing part 201, the input/output part 202, the conversion part 204 and the comparison part 205.

In the practice of the present invention, the card-authenticating apparatus 200 can also be embodied in an electronic computer system similar to that shown in FIG. 2. In the card-authenticating apparatus 200, the card processing device 309 is an electronic card reader device for reading data from the electronic card 500.

As the image input device 308 arranged in the card-authenticating apparatus 200, a device which inputs image data from a photograph of each would-be certified person or a device which directly takes a photograph of each would-be certified person and inputs image data thereof may be employed.

The respective parts shown in FIG. 3 are implemented as processes to be carried out on the electronic computer system by executing a program accessed by the CPU 301 from the main memory 302.

Figure 4:
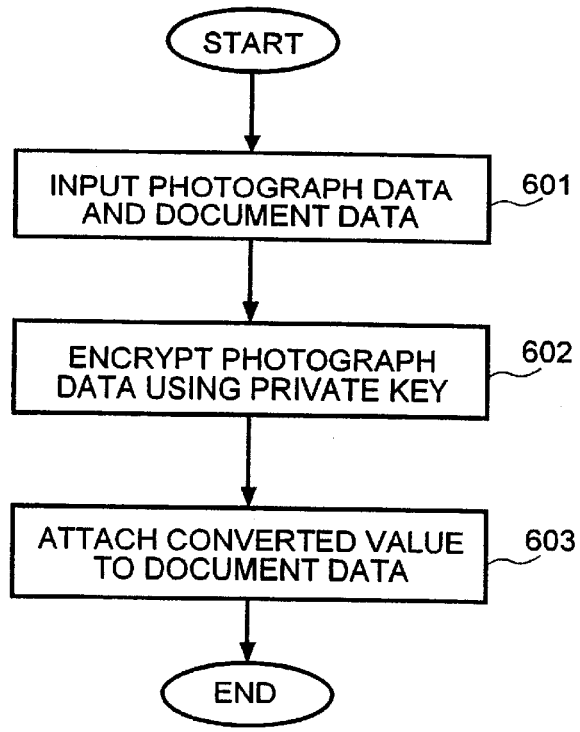
FIG. 4 is a flowchart showing a processing procedure to be carried out by the card-issuing apparatus according to the first preferred embodiment of the present invention.
Figure 5:
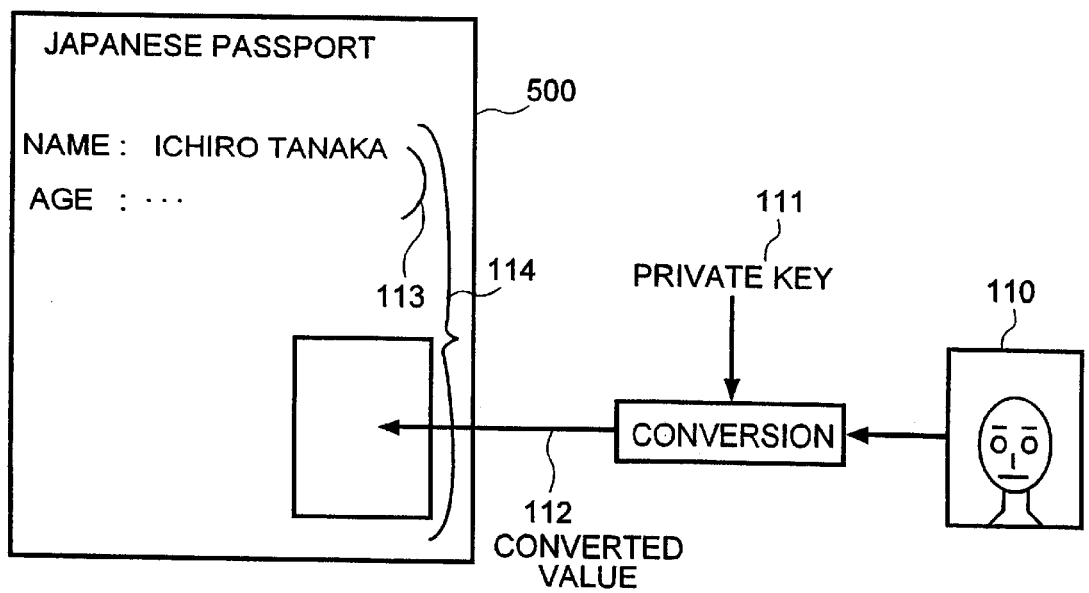
FIG. 5 is a diagrammatic illustration showing a transaction to be performed by the card-issuing apparatus according to the first preferred embodiment of the present invention.

FIG. 4 shows the processing procedure to be carried out by the control part 104 of the card-issuing apparatus 100, and FIG. 5 shows how the identification information recording medium 500 is handled. Note, however, that FIG. 5 is a diagrammatic illustration showing a data structure scheme prepared for easy understanding of the processing procedure.

In the discussion given below, it is assumed that the private key 111 formed by the certifier has already been input and stored into the card-issuing apparatus 100 through the input/output part 101.

As shown in FIGS. 4 and 5, for issuance of the identification information recording medium 500 for a certain person to be certified, the photograph data 110 of the person and the document data 113 containing the name, address, date of birth and other descriptions concerning the person are input through the input/output part 101 under direction of the control part 104 (step 601).

Then, through the conversion part 102, the photograph data 110 is encrypted using the private key 111 based on known public key cryptography to generate a converted value 112 as shown in FIG. 5 (step 602). Finally, through the attaching part 103, the converted value 112 is attached to the document data 113 to produce converted-value-attached document data 114, which is then written onto the identification information recording medium 500 through the input/output part 101 (step 603).

The identification information recording medium 500, on which the converted-value-attached document data 114 has thus been recorded, is given to and held by the person certified therewith. At a later time when authentication is required, the identification information recording medium 500 is presented by the thus certified person.

The following describes operations of the card-authenticating apparatus 200.

Figure 6:
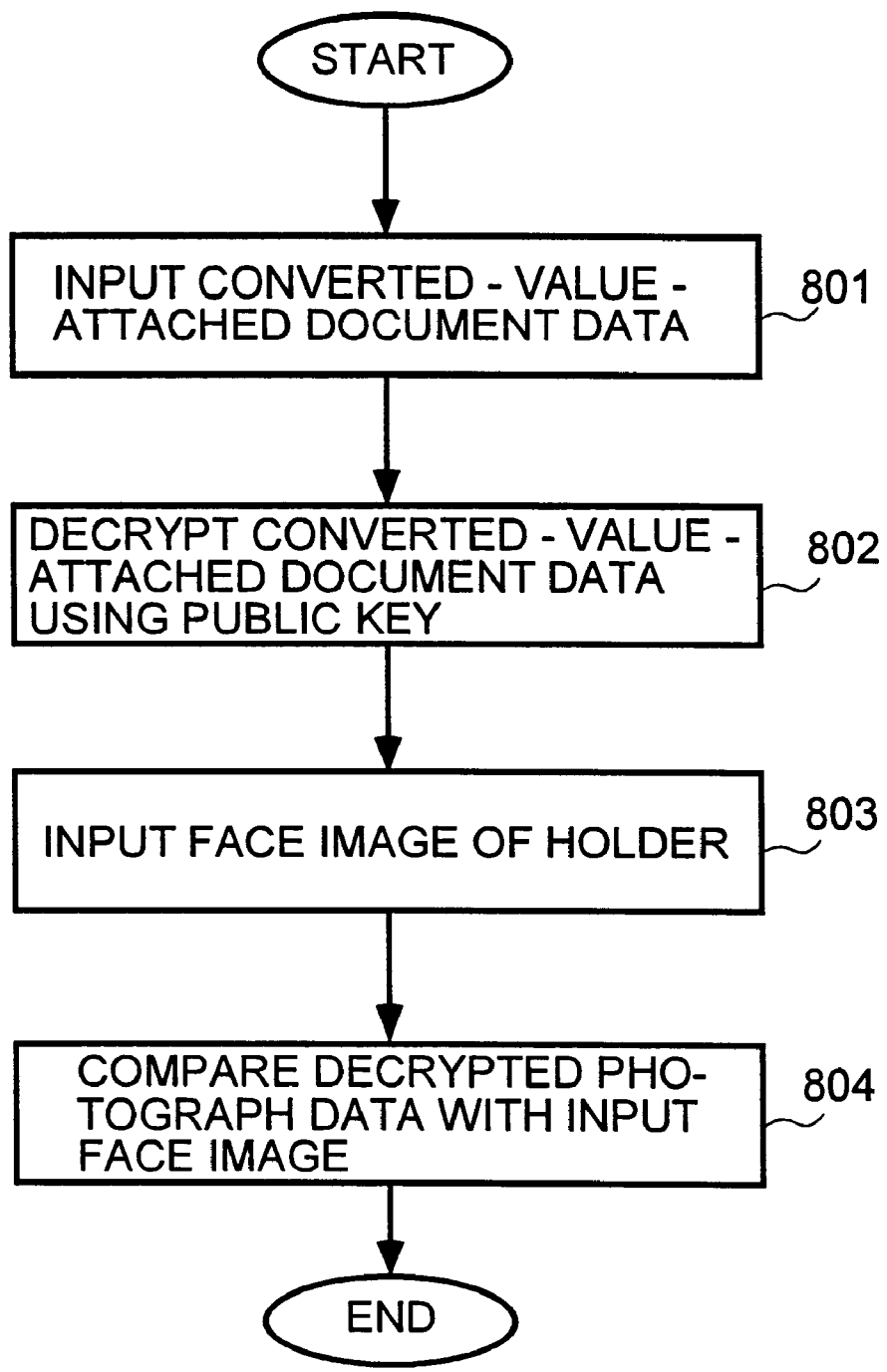
FIG. 6 is a flowchart showing a processing procedure to be carried out by the card-authenticating apparatus according to the first preferred embodiment of the present invention.
Figure 7:
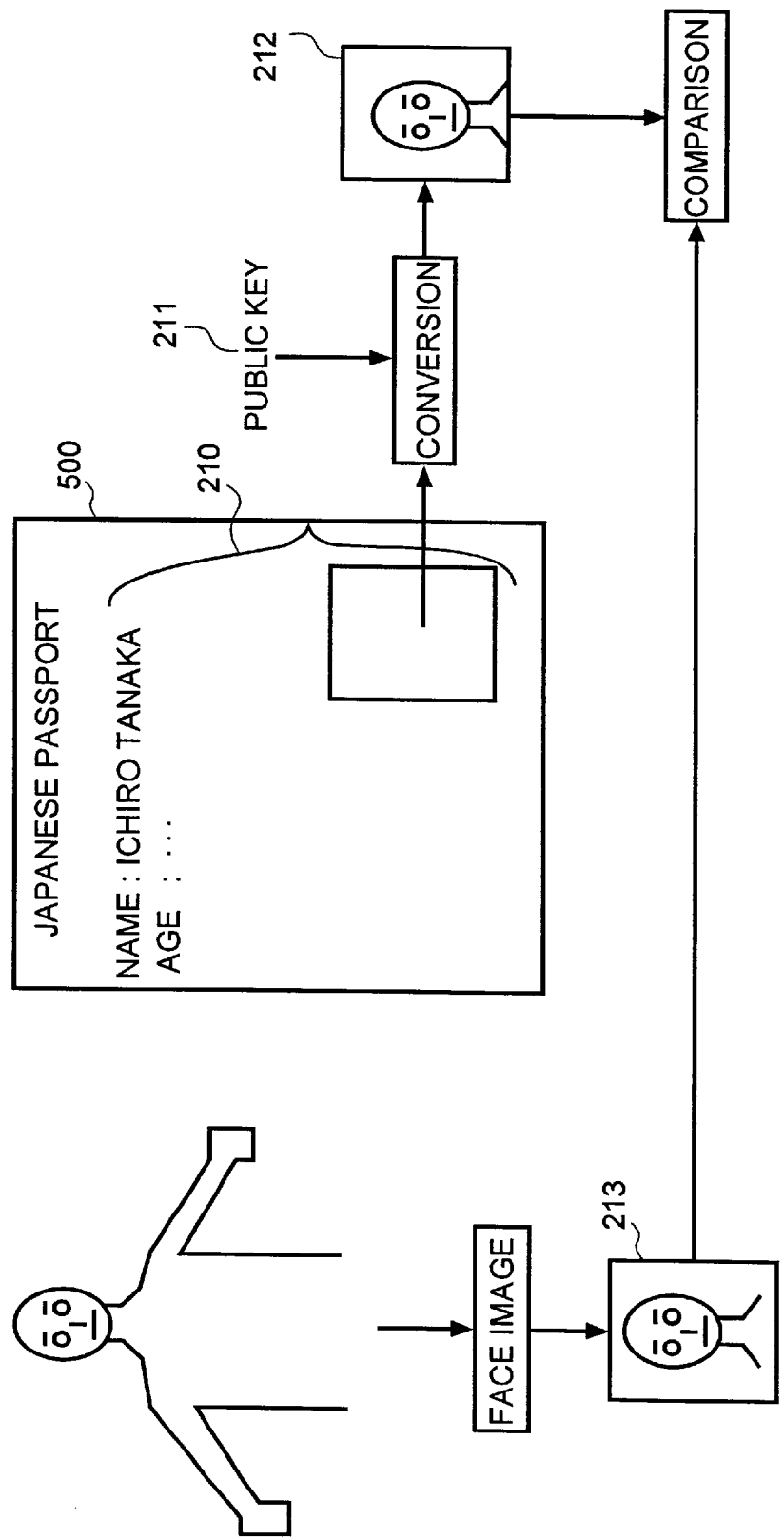
FIG. 7 is a diagrammatic illustration showing a transaction to be performed by the card-authenticating apparatus according to the first preferred embodiment of the present invention.

FIG. 6 shows the processing procedure to be carried out by the control part 203 of the card-authenticating apparatus 200, and FIG. 7 shows how the identification information recording medium 500 is handled. Note, however, that FIG. 7 is a diagrammatic illustration showing a data structure scheme prepared for easy understanding of the processing procedure.

In the discussion given below, it is assumed that the private key 111 formed by the certifier has already been input and stored into the card-authenticating apparatus 200 through the input/output part 202.

As shown in FIGS. 6 and 7, when a would-be certified person presents the identification information recording medium 500 held by the would-be certified person, the converted-value-attached document data 210 is input from the identification information recording medium 500 through the input/output part 202 under direction of the control part 203 of the card-authenticating apparatus 200 (step 801). Then, the photograph data 212 of the would-be certified person, which has been encrypted using the private key 111 formed by the certifier and which has then been contained in the converted-value-attached document data 210, is decrypted using the public key 211 of the certifier based on known public key cryptography through the conversion part 204. Thus, the photograph data 212 of the would-be certified person is decoded (step 802).

Then, through the photographing part 201 and the input/output part 202, a picture of the face of the would-be certified person is input as face image data 213 (step 803). Thereafter, through the comparison part 205, the face image data 213 is compared with the decrypted photograph data 212 by a pattern matching technique or the like to produce a result of comparison indicating whether a degree of similarity higher than a predetermined level is found therebetween. Through the input/output part 202, the result of comparison is displayed along with an image represented by the decrypted photograph data 212 and descriptions attained from document data contained in the converted-value-attached document data 210 (step 804). If the result of comparison indicates a degree of similarity higher than the predetermined level between the face image data 213 and the decrypted photograph data 212, the result of comparison signifies that the would-be certified person is certainly a person certified with the identification information recording medium 500, i.e., it is authenticated that the identification information recording medium 500 has been issued to the would-be certified person.

As mentioned above and according to the present preferred embodiment, photograph data of a certified person encrypted using a private key formed by a certifier is recorded onto an identification information recording medium as information identifying the certified person instead of mere photograph data of the certified person. In authentication of each would-be certified person, the encrypted photograph data is decrypted using a public key of the certifier, and the photograph data thus decrypted is compared with facial features of the would-be certified person. In such a case that the encrypted photograph data is decrypted using the public key of the certifier as stated above, it is extremely difficult to illegally forge the photograph data unless the corresponding private key formed by the certifier is known. Further, it is also very difficult to derive the private key formed by the certifier from the public key or the photograph data encrypted using the private key. Therefore, an identification information recording medium capable of effectively preventing forgery of information identifying each certified person can be provided according to the present preferred embodiment.

In a modified arrangement of the present invention, evaluation values of original data based on any one-way function may be used as data to be encrypted using the private key formed by the certifier. Where a one-way function such as a hash function is employed, though evaluation values calculated from data using the one-way function may be figured out, it is virtually impossible to figure out original data using the evaluation values.

In the present preferred embodiment mentioned above, only the photograph data of the certified person is encrypted using the private key formed by the certifier in the card-issuing apparatus 100. In a modified embodiment of the present invention, the following arrangement may be made: The document data containing the name, address, date of birth and other descriptions concerning the certified person is also encrypted using the private key formed by the certifier and the document data thus encrypted is recorded onto the identification information recording medium. Then, in the card-authenticating apparatus 200, the document data encrypted and recorded on the identification information recording medium is decrypted using the public key of the certifier at the time of authentication. In this manner, similar to the photograph data, the descriptions concerning the person certified with the identification information recording media can also be protected effectively against possible forgery.

As mentioned above, in the card-authenticating apparatus 200 in the present preferred embodiment, the face image data of the would-be certified person is compared with the image attained by decrypting the photograph data which has been encrypted by the private key of the certifier and recorded on the identification information recording medium, and the result of comparison is displayed. In a modified form of the present invention, the processing step of this comparison may be eliminated. More specifically, the image attained by decrypting the photograph data which has been encrypted by the private key of the certifier and recorded on the identification information recording medium and the document data recorded on the identification information recording medium are just displayed in the card-authenticating apparatus 200. Then, the certifier using the card-authenticating apparatus 200 compares the thus displayed image with the actual face of the would-be certified person. The certifier can thus form a judgment as to whether the appearance of the would-be certified person is identical with the displayed image which has been attained through the decryption mentioned above.

Further, in a modification of the present preferred embodiment mentioned above, there may be provided an arrangement in which only the photograph data encrypted using the private key of the certifier is recorded onto the identification information recording medium and the name, address, date of birth and other descriptions concerning the certified person are indicated in a directly visible form which is non-separable from the identification information recording medium. For example, for indication of the descriptions concerning the certified person, counterfeit-resistant characters may be printed or etched on the surface of an electronic card used as the identification information recording medium.

Still further, while the conversion parts 102 and 204 in the present preferred embodiment mentioned above are implemented as processes to be carried out on an electronic computer system by executing programs accessed by the CPU from the main memory, it is to be understood that the present invention is not limited to such a form of implementation. For example, LSI encryption hardware and LSI decryption hardware may be used in lieu of the programs accessed by the CPU from the main memory.

The following describes a second preferred embodiment of the present invention.

In the second preferred embodiment of the present invention, an authentication system comprises at least one center apparatus and at least one card-authenticating apparatus which are mutually connected through a network.

As an identification information recording medium, the present preferred embodiment uses a recording medium which allows recording characters and graphics in a directly visible form by printing or the like. For example, a paper, plastic or metallic card is used as the identification information recording medium.

Figure 8:
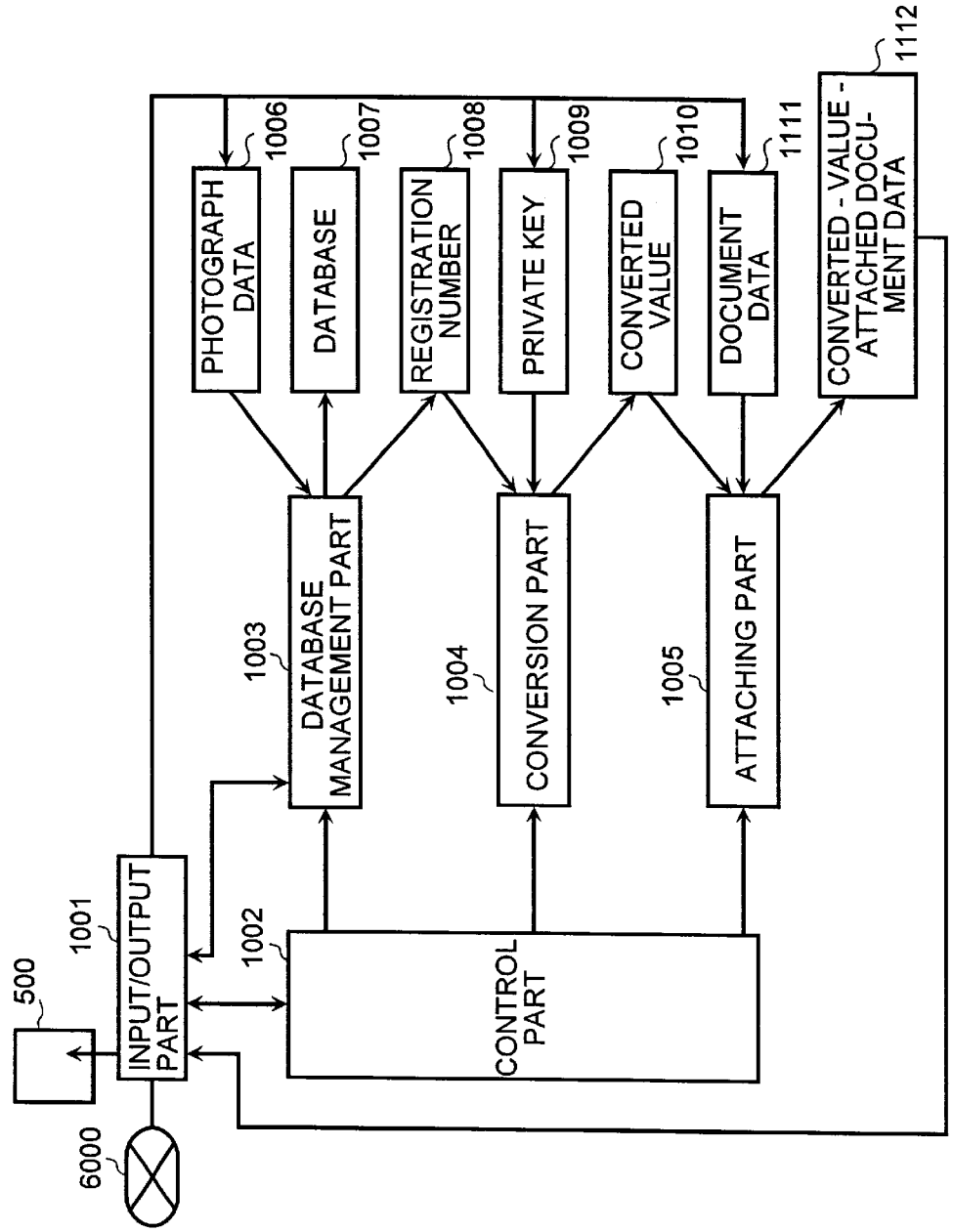
FIG. 8 is a block diagram showing an overall configuration of a center apparatus according to a second preferred embodiment of the present invention.

Referring to FIG. 8, there is shown an overall configuration of a center apparatus 1000, which comprises an input/output part 1001, a control part 1002, a database management part 1003, a conversion part 1004, and an attaching part 1005. The input/output part 1001 is used to input photograph data 1006 which is image data of a face of a person certified with an identification information recording medium 500, a private key 1009 formed by a certifier, and document data 1111 containing the name, address, date of birth and other description concerning the certified person assured with the identification information recording medium 500. The input/output part 1001 is also used to record converted-value-attached document data 1112 (to be described later) onto the identification information recording medium 500.

The database management part 1003 manages a database 1007 containing photograph data. When each photograph data 1006 is input through the input/output part 1001, the database management part 1003 assigns a registration number 1008 to the photograph data 1006, which is then registered into the database 1007. The registration number 1008 comprises a number for identifying the center apparatus 1000 used for registering the photograph data 1006.

The conversion part 1004 encrypts the registration number 1008 of the photograph data 1006 using the private key 1009 to generate a converted value 1010. The attaching part 1005 inserts the converted value 1010 (represented by a graphic barcode) into the document data 1111 to produce the converted-value-attached document data 1112.

Through a network 6000, the input/output part 1001 receives a query with a registration number from card-authenticating apparatus 2000, and then the input/output part 1001 feeds the received query to the database management part 1003. The database management part 1003 searches the database 1007 for photograph data corresponding to the registration number indicated in the query. When the photograph data of interest is found in the database 1007, the database management part 1003 returns the photograph data of interest to the input/output part 1001. Then, through the network 6000, the input/output part 1001 sends the photograph data of interest to the card-authenticating apparatus 2000 which has issued the query.

The control part 1002 controls the above-mentioned operations of the input/output part 1001, the database management part 1003, the conversion part 1004 and the attaching part 1005.

The center apparatus 1000 can also be embodied on an electronic computer system similar to that shown in FIG. 2. In a center apparatus 1000 of this type, a card 500 equivalent to the card 310 is used as an identification information recording medium, and the card processing device 309 is a printing system for printing the cards 500. As the image input device 308 arranged in the center apparatus 1000, a device which inputs image data from a photograph of each certified person or a device which directly takes a photograph of each certified person and inputs image data thereof may be employed.

The respective parts shown in FIG. 8 are also implemented as processes to be carried out on the electronic computer system by executing a program accessed by the CPU 301 from the main memory 302.

Figure 9:
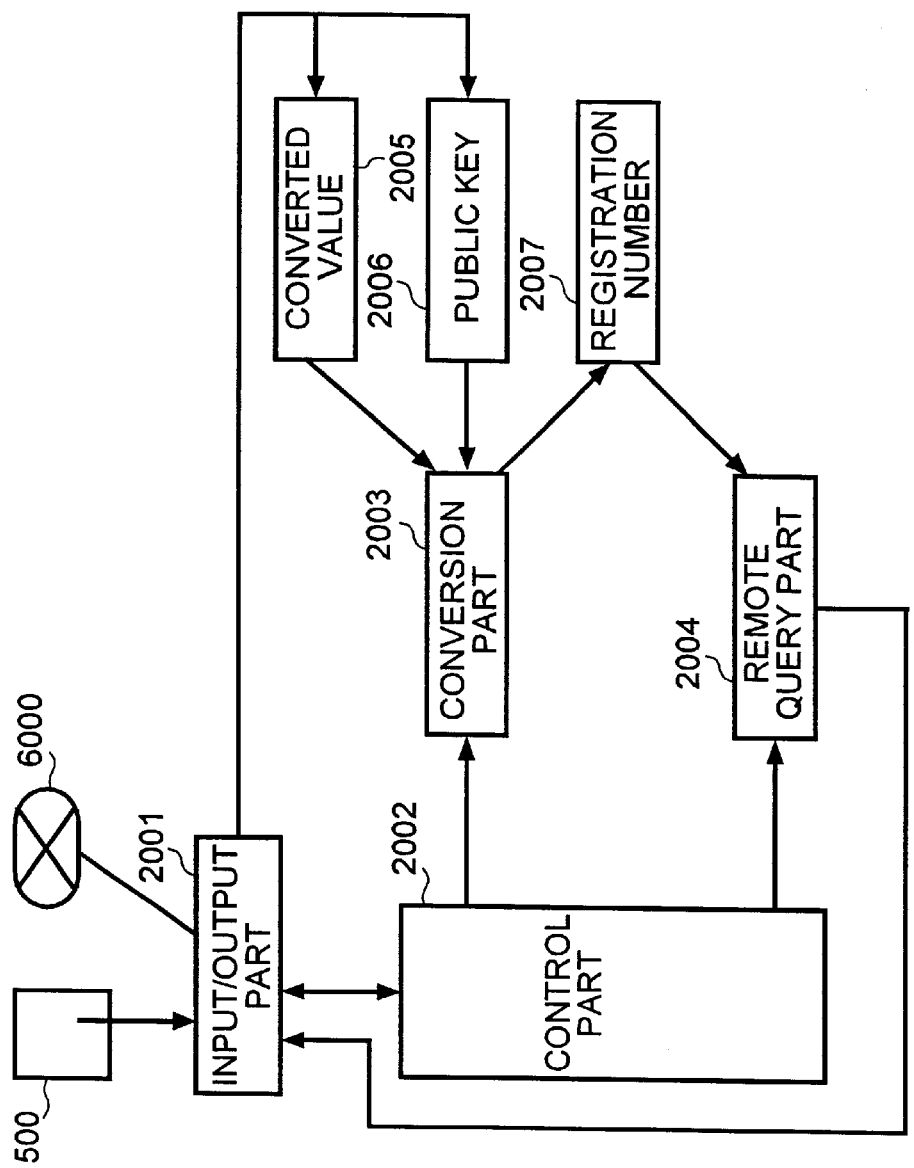
FIG. 9 is a block diagram showing an overall configuration of a card-authenticating apparatus according to the second preferred embodiment of the present invention.

Referring to FIG. 9, there is shown an overall configuration of a card-authenticating apparatus 2000, which comprises an input/output part 2001, a control part 2002, a conversion part 2003, and a remote query part 2004.

The input/output part 2001 is used to input a public key 2006 of the certifier and a converted value 2005 represented by a graphic barcode printed on the identification information recording medium 500. The input/output part 2001 is also used to send a query issued by the remote query part 2004 to the center apparatus 1000 through the network 6000. When the input/output part 2001 receives photograph data from the center apparatus 1000 as an answer to the query, the input/output part 2001 passes the photograph data to the remote query part 2004. Further, the input/output part 2001 is used to display an image of the photograph data retrieved by the remote query part 2004.

Using the public key 2006 of the certifier, the conversion part 2003 decrypts the converted value 2005 to attain a registration number 2007 of the photograph data. Through the input/output part 2001, the remote query part 2004 issues a query with the decrypted registration number via network 6000 to the center apparatus 1000 which is identified by a number contained in the registration number. Thus, the photograph data corresponding to the registration number is retrieved from the database 1007 in the center apparatus 1000, and the retrieved photograph data is supplied to the input/output part 2001 to display an image represented thereby.

The control part 2002 controls the above-mentioned operations of the input/output part 2001, the conversion part 2003 and the remove query part 2004.

The card-authenticating apparatus 2000 can also be embodied on an electronic computer system similar to that shown in FIG. 2. It is not necessarily required to provide the image input device 308. In the card-authenticating apparatus 2000, the card processing device 309 is a barcode reader device for reading out a barcode printed on the card 500.

The respective parts shown in FIG. 9 are also implemented as processes to be carried out on the electronic computer system by executing a program accessed by the CPU 301 from the main memory 302.

Figure 10:
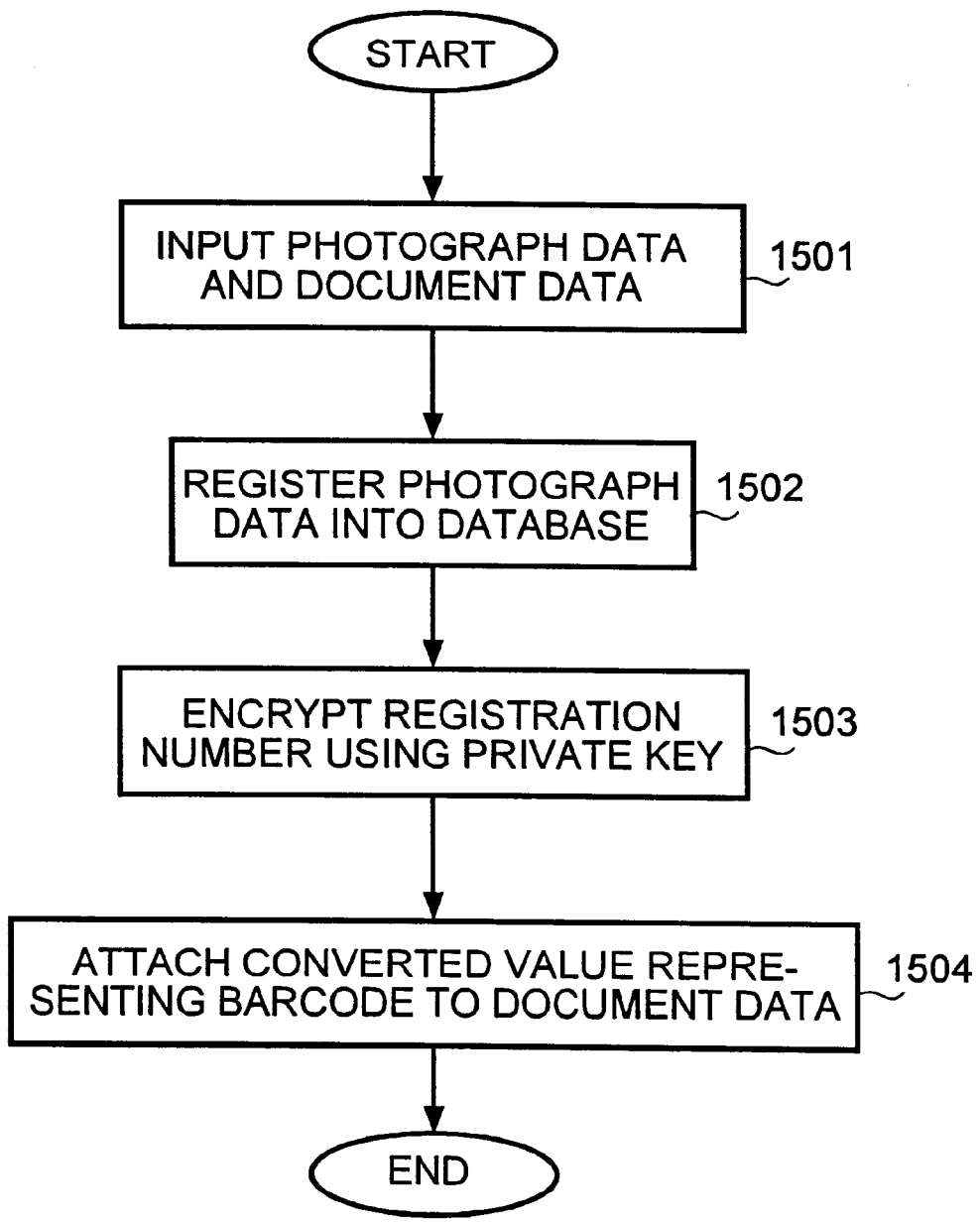
FIG. 10 is a flowchart showing a processing procedure to be carried out by the center apparatus according to the second preferred embodiment of the present invention.
Figure 11:
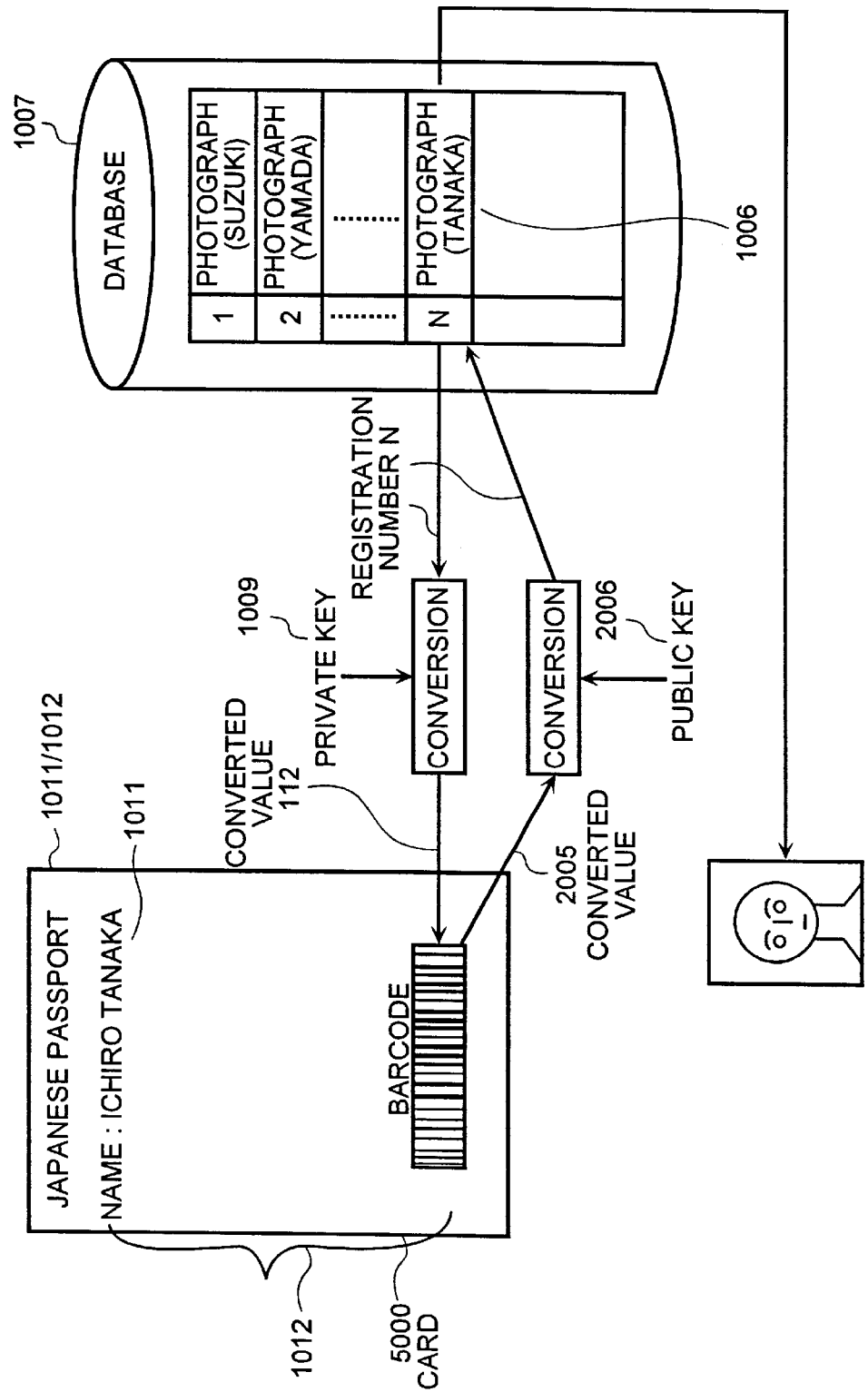
FIG. 11 is a diagrammatic illustration showing a transaction to be performed by the center apparatus or the card-authenticating apparatus according to the second preferred embodiment of the present invention.

Referring to FIGS. 10 and 11, the following describes the processing procedure to be carried out by the control part 1002 of the center apparatus 1000.

In the discussion given below, it is assumed that the private key 1009 formed by the certifier has already been input and stored into the center apparatus 1000 through the input/output part 1001.

As shown in FIGS. 10 and 11, for issuance of the identification information recording medium 500 for a certain person to be certified, the photograph data 1006 of the person and the document data 1011 containing the name, address, date of birth and other descriptions concerning the person are input through the input/output part 1001 under direction of the control part 1002 (step 1501).

Then, through the database management part 1003, a registration number containing a number for identifying the center apparatus is assigned to the input photograph data 1006 as shown in FIG. 11. The photograph data 1006 is registered into the database 1007 together with the registration number (step 1502).

Then, through the conversion part 1004, the registration number of the photograph data 1006 registered in the database 1007 is encrypted using the private key 1009 based on known public key cryptography to generate a converted value 112 (step 1503). Finally, through the attaching part 1005, the converted value 112 is attached to the document data 1011 to produce converted-value-attached document data 1112 which represents a document 1012 containing a graphic barcode. The document 1012 represented by the converted-value-attached document data 1112 is then printed onto the identification information recording medium 500 through the input/output part 1001 (step 1504).

The identification information recording medium 500, on which the document 1012 represented by the converted-value-attached document data 1112 has thus been recorded, is given to and held by the person certified therewith. At a later time when authentication is required, the identification information recording medium 500 is presented by the thus certified person.

As aforementioned, when the input/output part 1001 receives a query with a registration number from the card-authenticating apparatus 2000 through the network 6000, the control part 1002 controls the database management part 1003 to search the database 1007 for photograph data corresponding to the registration number indicated in the query. When the photograph data of interest is found in the database 1007, the photograph data of interest is returned to the input/output part 1001. Then, through the network 6000, the input/output part 1001 sends the photograph data of interest to the card-authenticating apparatus 2000 which has issued the query.

Referring FIGS. 12 and 11, the following describes the processing procedure to be carried out by the control part 2002 of the card-authenticating apparatus 2000.

In the discussion given below, it is assumed that the public key 2006 of the certifier has already been input and stored into the card-authenticating apparatus 2000 through the input/output part 2001.

As shown in FIGS. 12 and 11, when a would-be certified person presents the identification information recording medium 500 held by the would-be certified person, a barcode printed on the identification information recording medium 500 20 is read out through the input/output part 2001 under direction of the control part 2002 of the card-authenticating apparatus 2000. Then, the barcode thus read out is translated into a numeric value corresponding to a converted value 2005 (step 1007).

Through the conversion part 2003, the converted value 2005 is decrypted using the public key 2006 of the certifier based on known public key cryptography to attain a registration number 2007 (step 1702). Then, through the input/output part 2001, the remote query part 2004 issues a query with the decrypted registration number to the center apparatus 1000 which is identified by a number contained in the registration number 2007. Thus, according to the registration number 2007, the photograph data of interest is retrieved from the database 1007 in the center apparatus 1000 (step 1703). The photograph data thus retrieved is supplied to the input/output part 2001 to display an image represented thereby (step 1704).

Then, the certifier using the card-authenticating apparatus 2000 compares the thus displayed image with the actual face of the would-be certified person. The certifier can thus form a judgment whether the appearance of the would-be certified person is identical with the displayed image which has been attained through the decryption mentioned above.

According to the second preferred embodiment of the present invention described above, since the encrypted registration number of the photograph data is recorded onto the identification information recording medium in lieu of the encrypted photograph data, there is provided an advantage that the amount of information recorded on the identification information recording medium can be reduced substantially, in addition to the advantageous effects stated in the foregoing description of the first preferred embodiment of the present invention. Therefore, in accordance with the second preferred embodiment, information identifying the certified person can also be recorded onto a non-electronic recording medium such as a paper card by printing a barcode, for example. Further, since the center apparatus 1000 where photograph data corresponding to each registration number is registered can be identified by a number contained in the registration number received from the card-authenticating apparatus 2000, it is possible to provide a plurality of center apparatuses 1000 as required in some applications.

Further, while a barcode representing each encrypted registration number of photograph data is recorded onto the identification information recording medium in the second preferred embodiment, a numeric value directly indicating each encrypted registration number of photograph data may also be recorded onto the identification information recording medium in lieu of the barcode. There may also be provided a modified arrangement in which each encrypted registration number of photograph data is electronically recorded onto an electronic recording medium used as the identification information recording medium.

Still further, while the conversion parts 1004 and 2003 in the second preferred embodiment are implemented as processes to be carried out on an electronic computer system by executing programs accessed by the CPU from the main memory, it is to be understood that the present invention is not limited to such a form of implementation. For example, LSI encryption hardware and LSI decryption hardware may be used in lieu of the programs loaded from the CPU into the main memory.

Still further, in a modification of the second preferred embodiment, the following arrangement may be made in the same fashion as in the first preferred embodiment. In the card-authenticating apparatus 200, face image data of the would-be certified person is input and compared with the photograph data retrieved according to the registration number encrypted using the private key of the certifier which is recorded on the identification information recording medium, and the result of comparison is displayed.

Furthermore, while the photograph data of each certified person is used as information for identification of the certified person and an encrypted value of the photograph data or an encrypted value of the registration number of the photograph data is recorded onto the identification information recording medium in each preferred embodiment mentioned above, it is to be understood that the present invention is not limited to such a form of embodiment.

In a modified embodiment of the present invention, there may be provided an arrangement in which a finger print, voiceprint, iris pattern, retina pattern, height value, weight value, gene pattern, blood information or other feature information of each certified person is used individually or in combination for identification of the certified person in lieu of the photograph data or in combination therewith.

As set forth hereinabove, the present invention provides a recording medium containing information for authenticating a individual and an authentication system using the same for enabling effective prevention of forgery of information for individual identification such as a photograph of a person's face in a passport.

While the present invention has been described in detail and pictorially in the accompanying drawings, it is not limited to such details since many changes and modifications recognizable to those of ordinary skill in the art may be made to the invention without departing from the spirit and the scope thereof.

What is claimed is:

1. A recording medium containing information for authenticating a particular individual in a recording medium issuing apparatus, comprising:

a region for managing a database to store a feature value usable for identification of a particular individual to be authenticated with said recording medium, and generating search information containing information for identifying said recording medium issuing apparatus;

a region for recording cryptographic information generated by encrypting the search information to retrieve from the database the feature value usable for identification of a particular individual to be authenticated with said recording medium, using a private key of a certifier based on public key cryptography; and a region for recording certification information concerning the individual to be authenticated with said recording medium, wherein the cryptographic information is subseguently decrypted to decode the search information, and decoded search information is used for requesting to search the database identifying said recording medium issuing apparatus.

2. An authentication system for authenticating a particular individual using a recording medium containing information for identifying the individual, comprising:

a recording medium issuing apparatus including:

a database for storing a feature value usable for identification of a particular individual to be authenticated with said recording medium, means for managing said database to store the feature value usable for identification of the individual to be authenticated with said recording medium, and for generating search information to retrieve from said database the feature value usable for identification of the individual to be authenticated with said recording medium, means for generating cryptographic information by encrypting the generated search information using a private key of a certifier based on public key cryptography, and means for recording onto said recording medium the generated cryptographic information and certification information concerning the individual to be authenticated with said recording medium; and a recording medium authenticating apparatus including:

means for decrypting the cryptographic information recorded on said recording medium using a public key paired with said private key to decode the search information, and means for requesting the recording medium issuing apparatus to search database using the decoded search information to retrieve the feature value usable for identification of the particular individual to be authenticated with said recording medium, and a plurality of recording medium issuing apparatuses, wherein, at one of the plurality of recording medium issuing apparatuses, said means for managing said database generates the search information containing information for identifying the recording medium issuing apparatuses;

wherein, at the recording medium authenticating apparatus, said means for requesting to search database identifies the recording medium issuing apparatuses by the decoded search information containing information for identifying the recording medium issuing apparatuses; and wherein the recording medium issuing apparatus further comprises means for searching said database using the decoded information to retrieve the feature value and for sending the retrieved feature value to the recording medium authenticating apparatus.

3. The authentication system according to claim 2, wherein the recording medium authenticating apparatus further comprises:

means for performing comparison between the retrieved feature value and a feature value of an individual who would be certified.

4. An authentication method for authenticating a particular individual using a recording medium containing information for identifying the individual, comprising the steps of:

storing, at a recording medium issuing apparatus, into a database a feature value usable for identification of a particular individual to be authenticated with said recording medium, and generating search information to retrieve from said database the feature value usable for identification of the individual to be authenticated with said recording medium;

generating, at the recording medium issuing apparatus, cryptographic information by encrypting the generated search information using a private key of a certifier based on public key cryptography;

recording, at the recording medium issuing apparatus, onto said recording medium the generated cryptographic information and certification information concerning the individual to be authenticated with said recording medium;

decrypting, at the recording medium authenticating apparatus, the cryptographic information recorded on said recording medium using a public key paired with said private key to decode the search information;

requesting, at the recording medium authenticating apparatus, a recording medium issuing apparatus to search said database using the decoded search information to retrieve the feature value usable for identification of the individual to be authenticated with said recording medium;

searching, at the recording medium issuing apparatus, said database using the decoded search information to retrieve the feature value;

sending, at the recording medium issuing apparatus, the retrieved feature value to the recording medium authenticating apparatus; and performing, at the recording medium authenticating apparatus, comparison between the retrieved feature value usable for identification of the particular individual to be authenticated with said recording medium and a feature value of an individual who would be certified;

wherein the step for generating search information at the recording medium issuing apparatus comprises generating the search information containing information for identifying one of a plurality of recording medium issuing apparatuses; and wherein the step for requesting to search at the recording medium authenticating apparatus, comprises identifying the recording medium issuing apparatus by the search information containing information for identifying the recording medium issuing apparatus.

\* \* \* \* \*